Jan. 15, 1957   J. O. McCAHON ET AL   2,777,562
MACHINE FOR FEEDING BOOKS TO A CASING-IN MACHINE
Filed Oct. 3, 1955   10 Sheets-Sheet 7
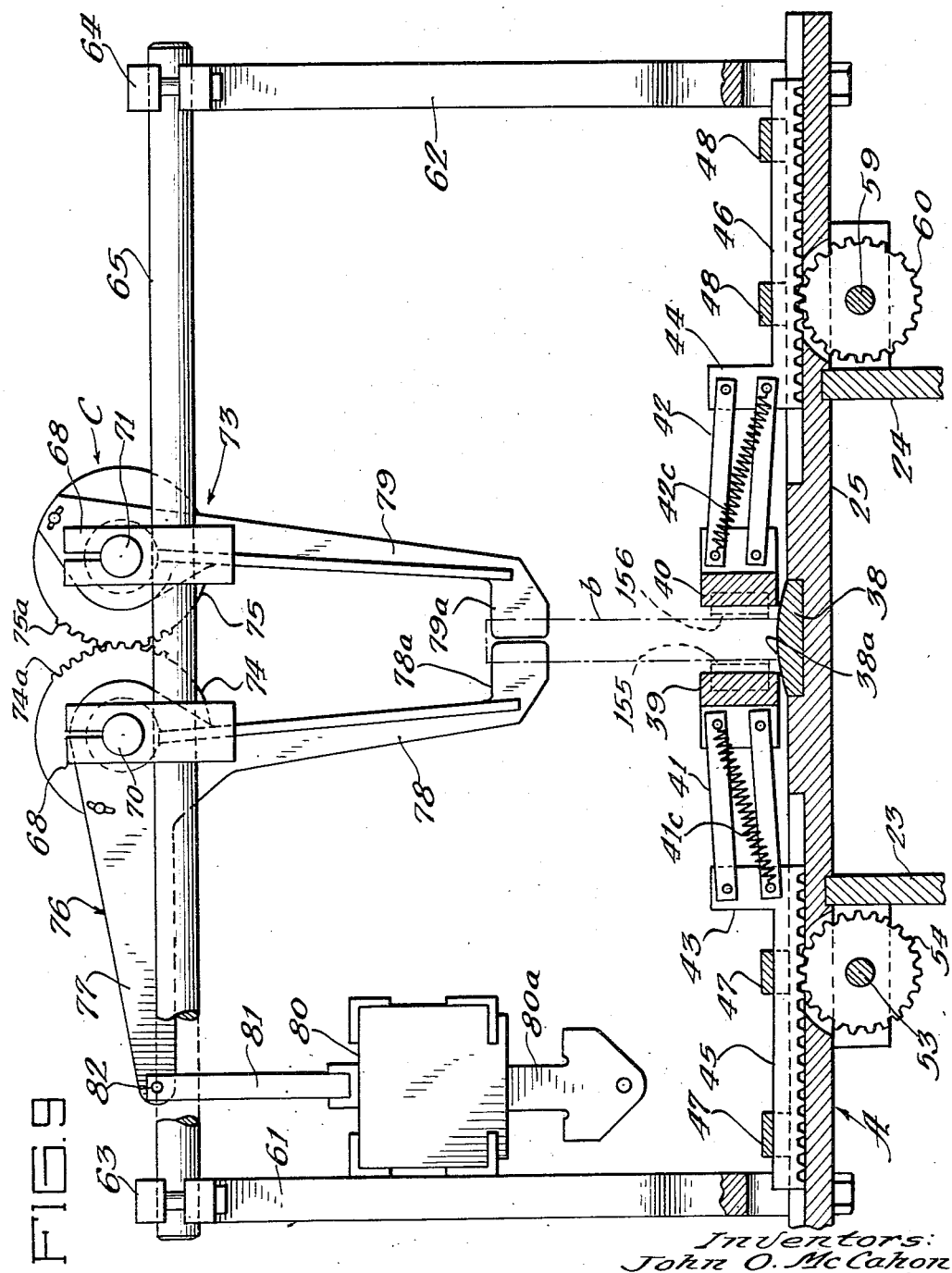
Inventors:
John O. McCahon
Robert G. Proctor
By: Schroeder, Hofgren,
Brady & Wegner
Attorneys Jan. 15, 1957   J. O. McCAHON ET AL   2,777,562
MACHINE FOR FEEDING BOOKS TO A CASING-IN MACHINE
Filed Oct. 3, 1955   10 Sheets-Sheet 8
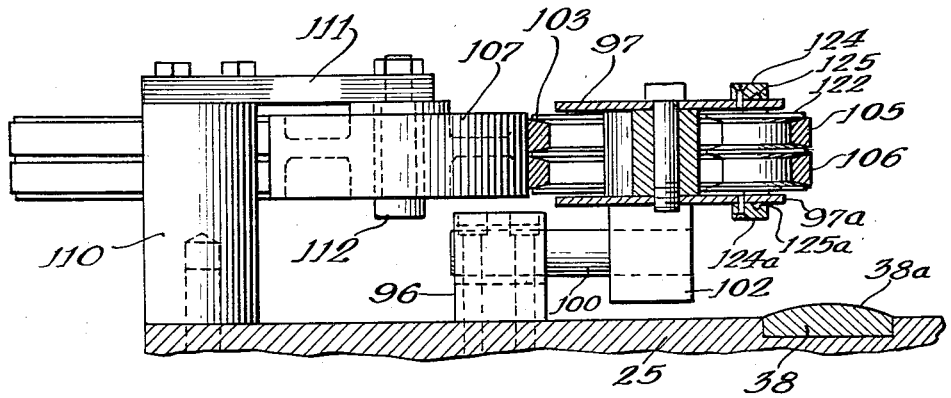
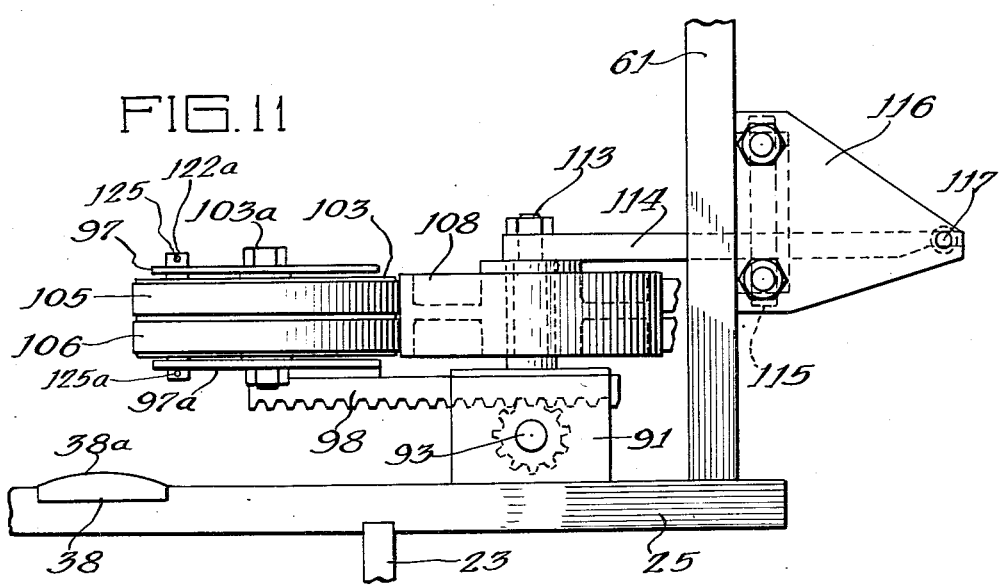
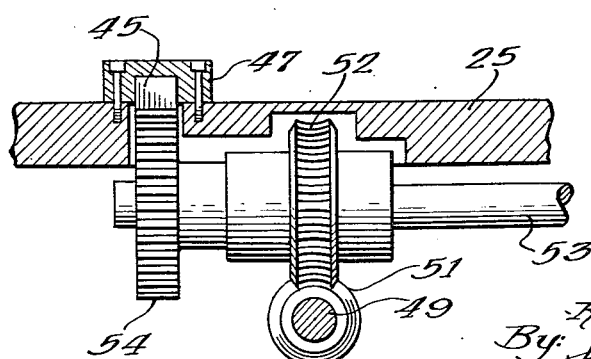
Inventors:
John O. McCahon
Robert G. Proctor
By: Schroeder, Hofgren,
Brady & Wegner
Attorneys Jan. 15, 1957  J. O. McCAHON ET AL  2,777,562
MACHINE FOR FEEDING BOOKS TO A CASING-IN MACHINE
Filed Oct. 3, 1955  10 Sheets-Sheet 9
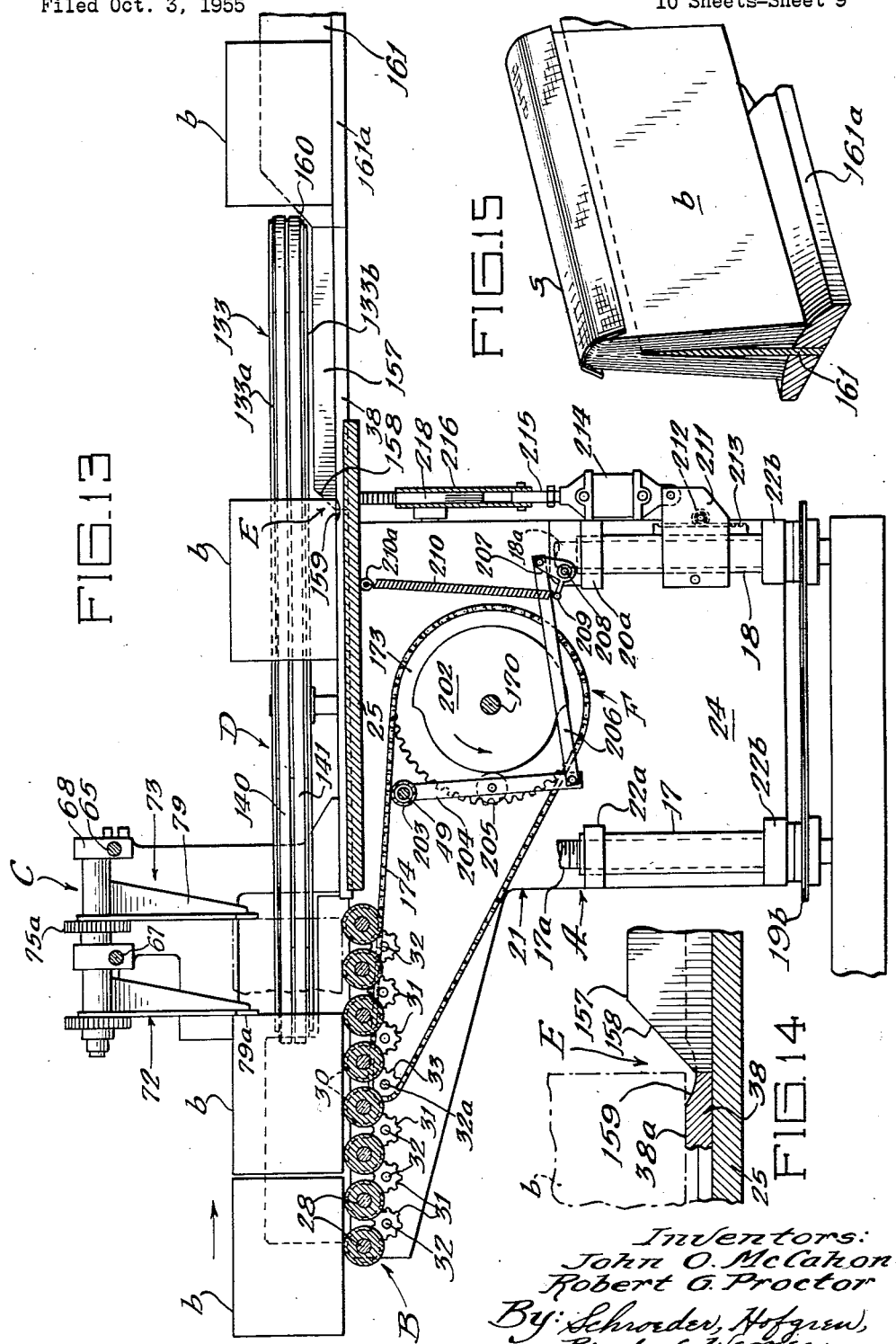
Inventors:
John O. McCahon
Robert G. Proctor
By: Schroeder, Hofgren,
Brady & Wegner
Attorneys

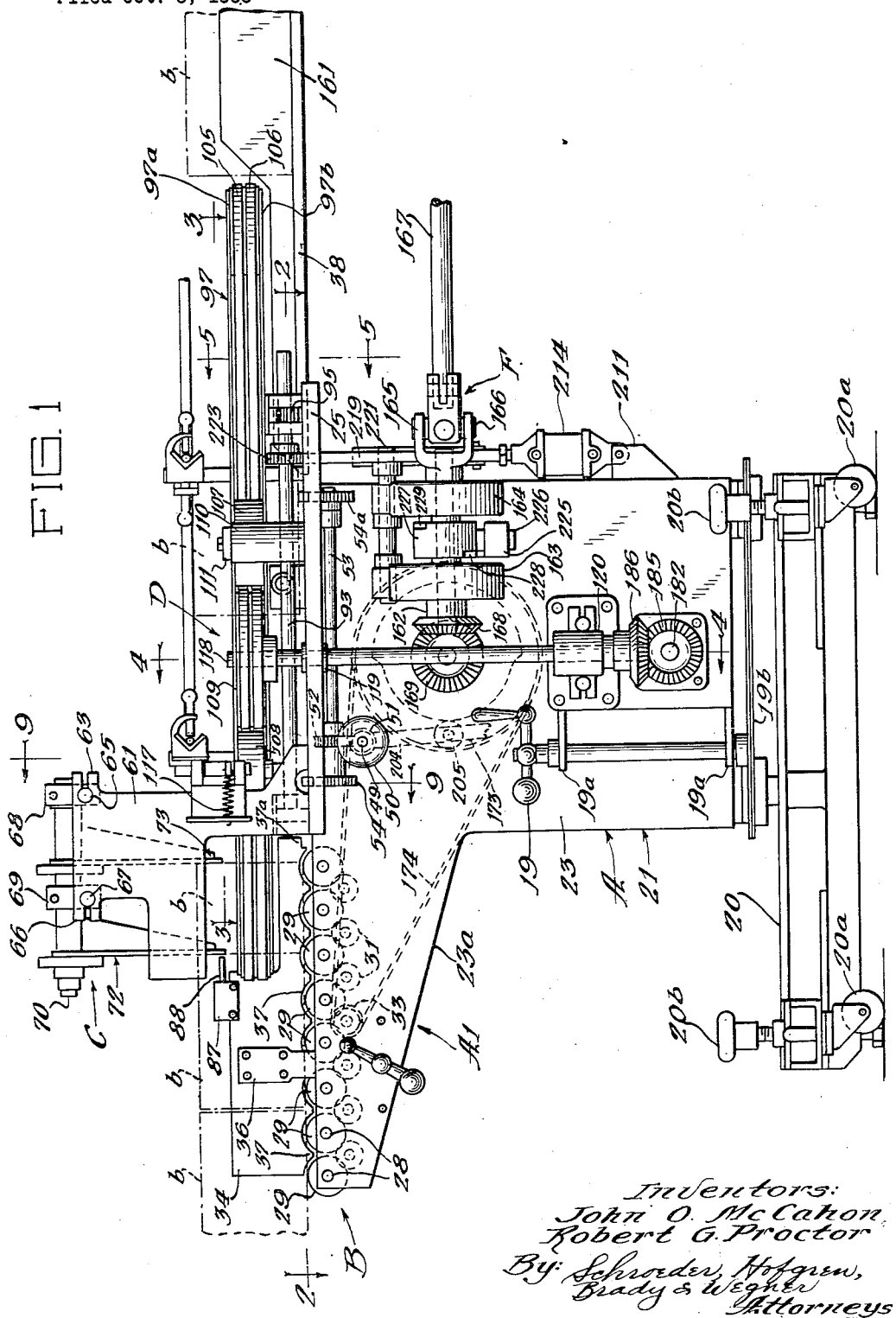

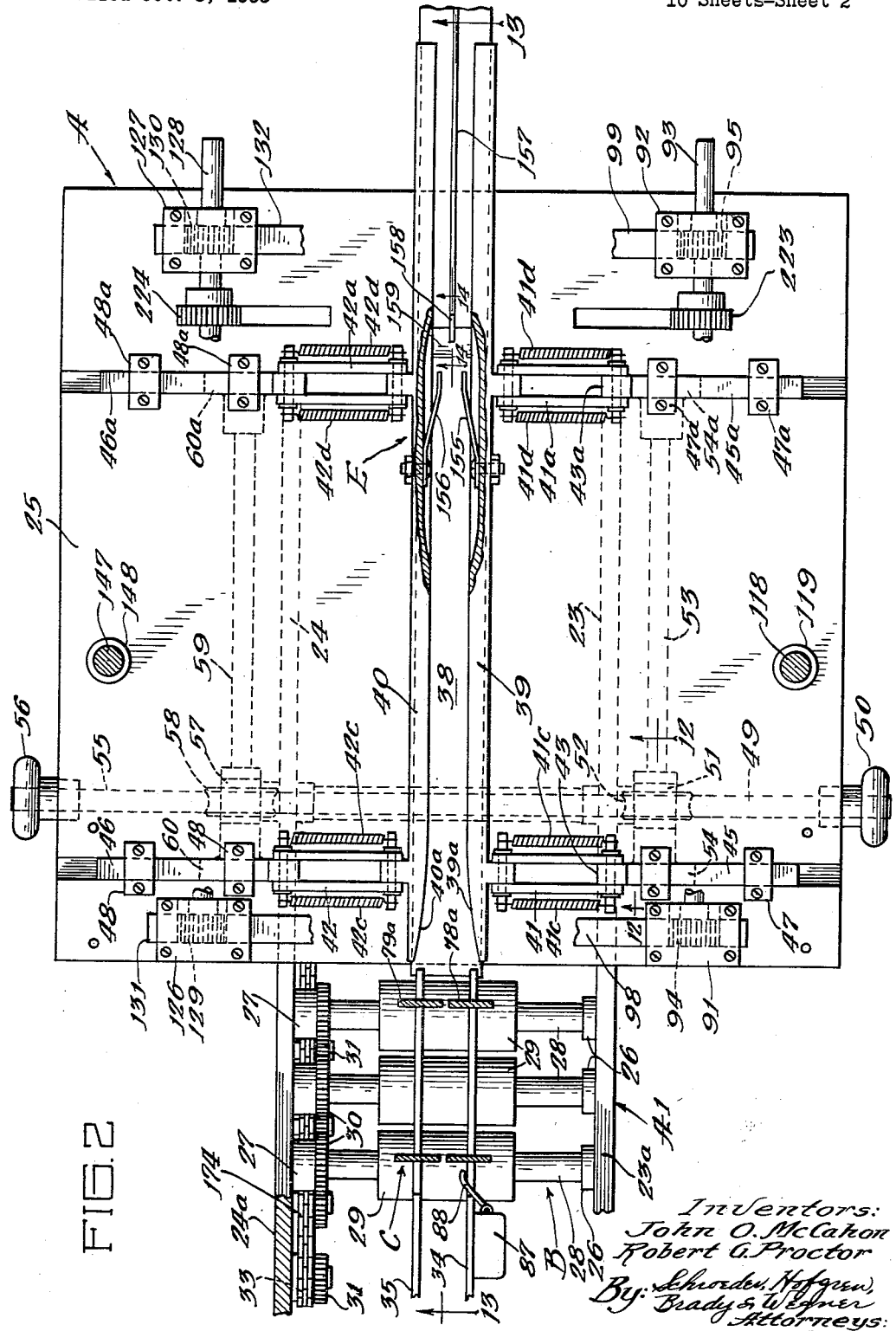

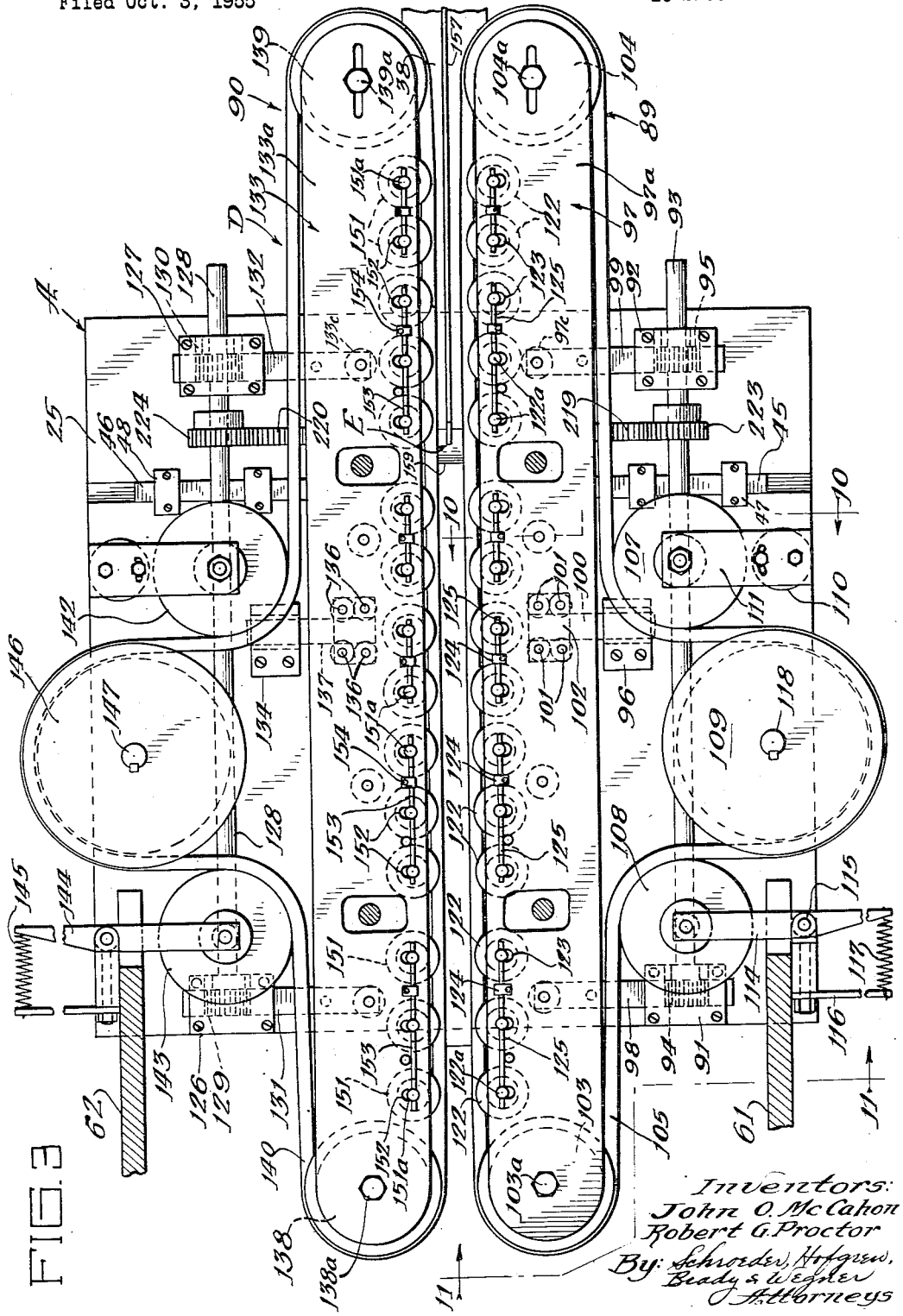

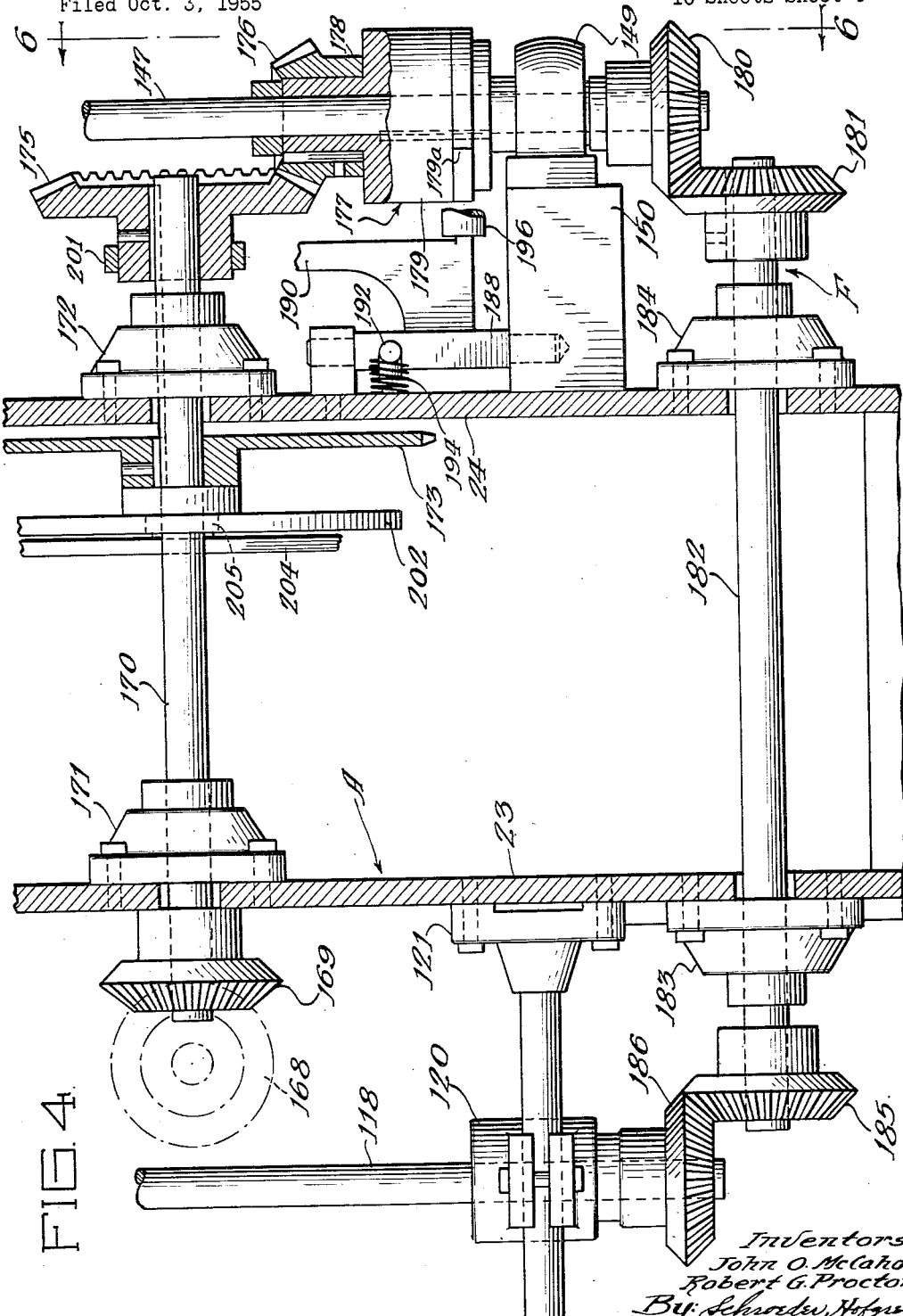

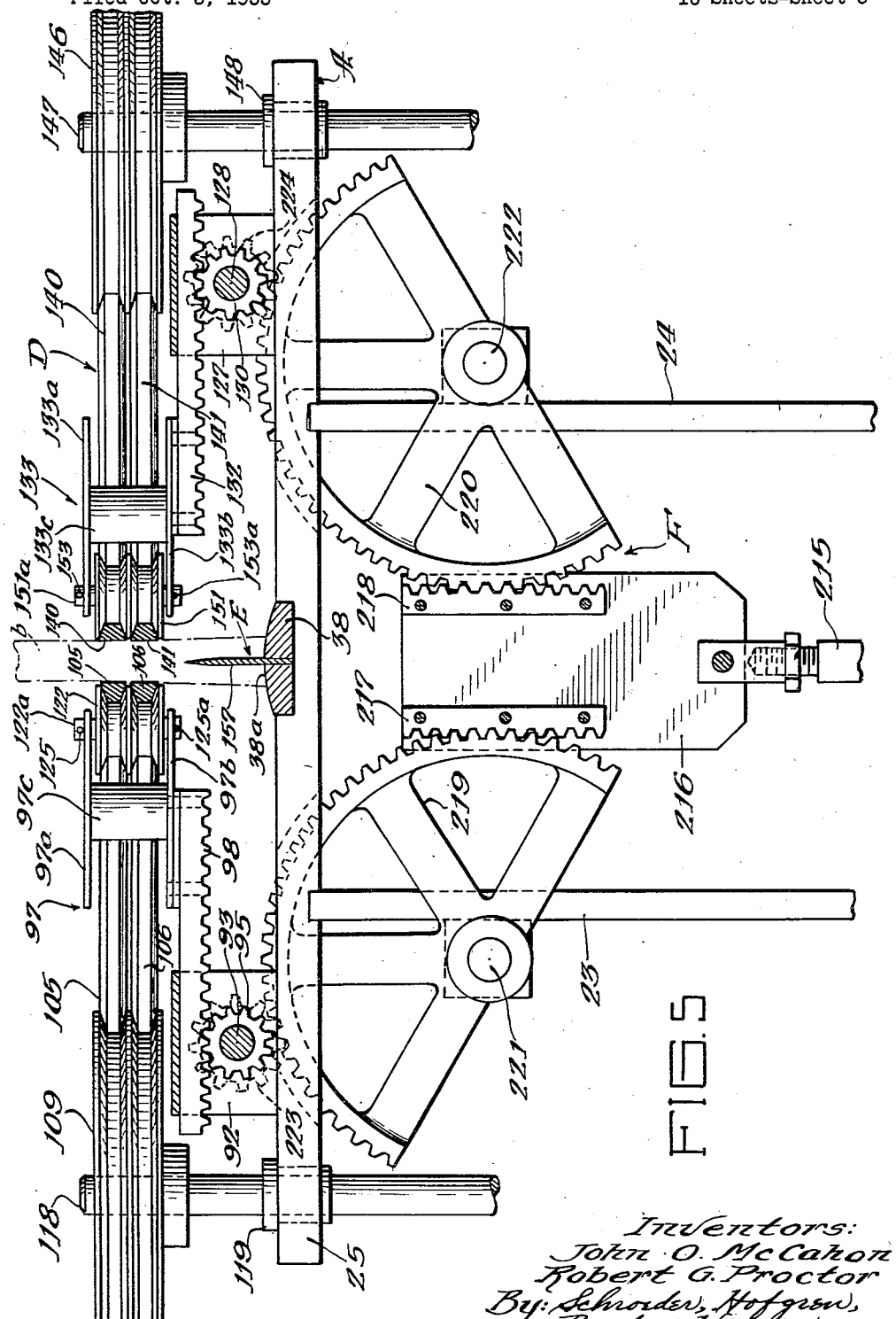

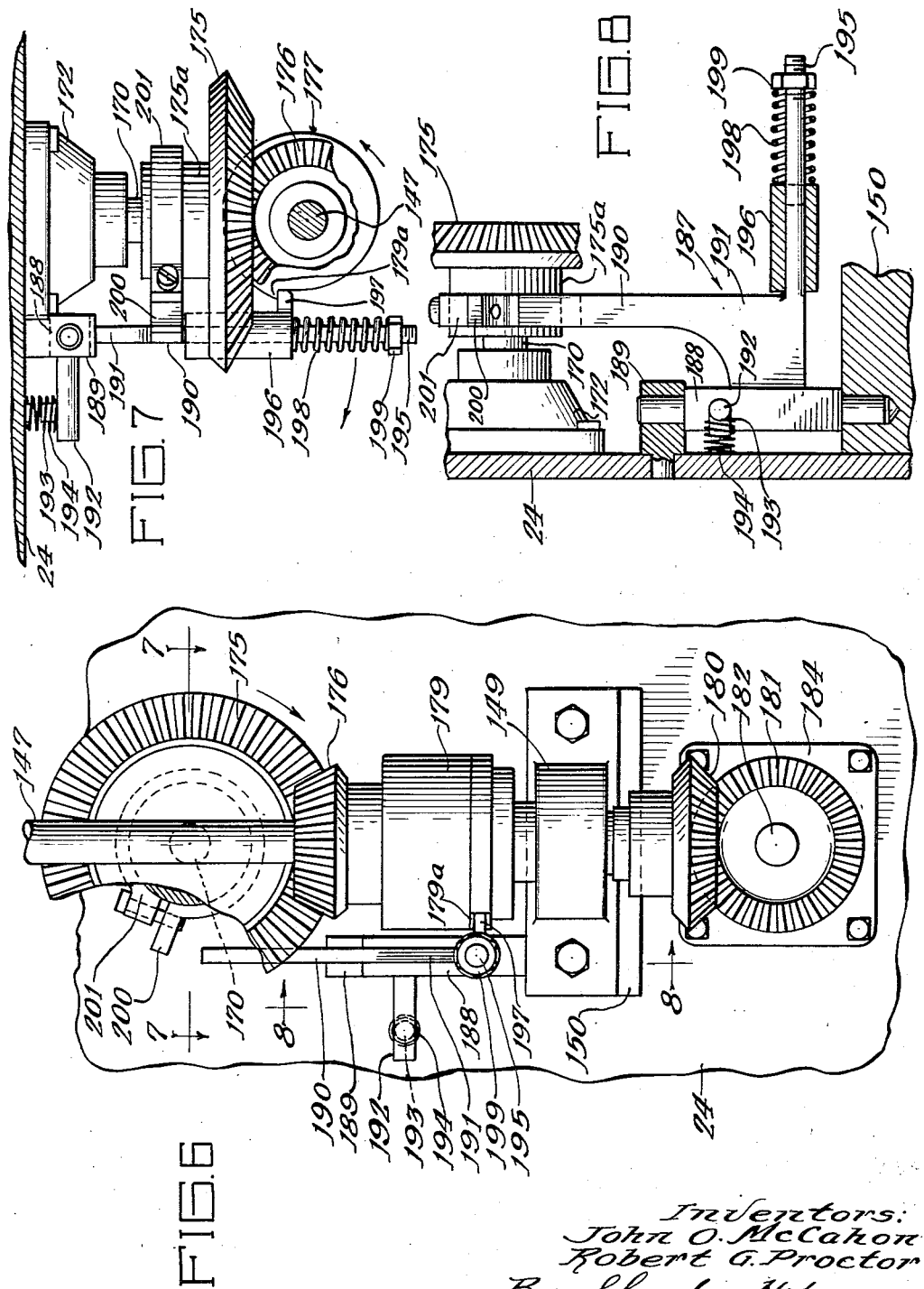

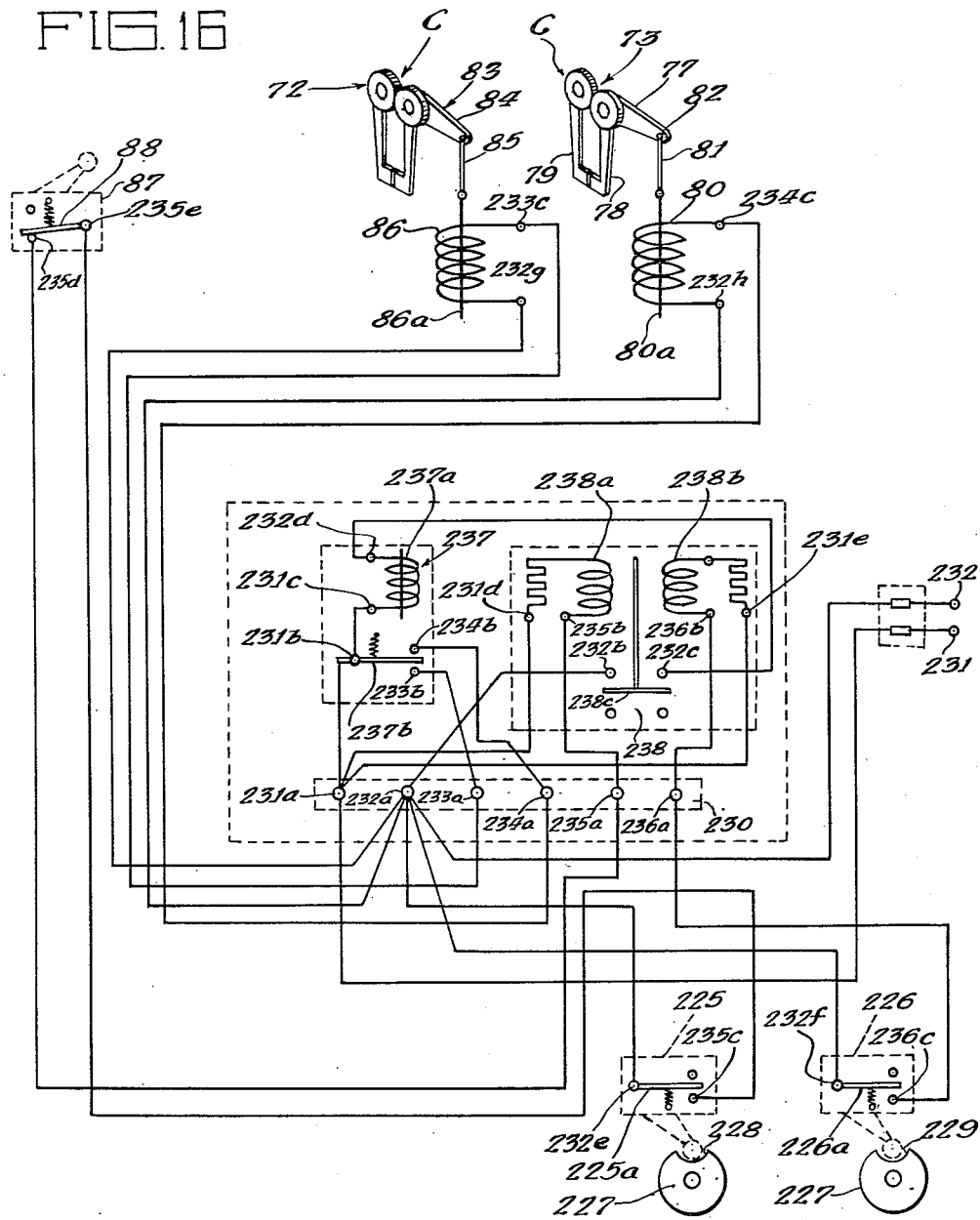

United States Patent Office 2,777,562
Patented Jan. 15, 1957

2,777,562

MACHINE FOR FEEDING BOOKS TO A CASING-IN MACHINE

John O. McCahon and Robert G. Proctor, Crawfordsville, Ind., assignors, by mesne assignments, to R. R. Donnelley & Sons Company, Chicago, Ill., a corporation of Delaware Application October 3, 1955, Serial No. 537,931

8 Claims. (Cl. 198—34)

This invention relates to a machine for feeding books to a casing-in machine.

The principal object of the invention is to provide a machine which will receive books which have been processed for casing-in and deliver them to a casing-in machine with the spine or backbone uppermost ready for the casing-in operation, and to perform this function smoothly with a minimum of book damage.

A further object of the invention is to provide a book feed in which a pair of opposed horizontally running belt units are mounted on laterally reciprocable carriages so that the belts may be moved toward each other to grip a book and carry it toward the casing-in machine with its spine up and the lower edges of its pages only lightly in contact with a support guide beneath the books so as to minimize marking and bending of the pages. The belt units employ V-belts which are suitably guided so as to provide the majority of the support for the books engaged by the belts.

A further object of the invention is to provide a book feeder in which the book gripping V-belts are carried on a series of closely spaced guide pulleys which are mounted on laterally yieldable supports so as to provide adequate tolerance to accommodate the variations in book thickness which may occur in a single run of books. This variation may be of the order of 1/16 inch due to differences in the thickness of the paper stock in a single lot of paper.

A further object of the invention is to provide a book feeder in which the carriages for the belt units are moved laterally by a mechanism including a pneumatic cylinder and piston unit which is adjustably mounted to accommodate the carriages to handle books of different thicknesses.

A further object of the invention is to provide a book feeding device in which the support guide beneath the books has a recess at its inner end, and the book is fed between a pair of opposed book fanning members which are positioned below the V-belts and above the support guide to fan out the lower portions of the pages below the belts as the leading edge of the book is over the recess in the support guide, so that the book may be fed onto a fixed splitter blade which enters the space between pages almost exactly at the middle of the book while the book is supported by the V-belts in such a manner that the portion of the book below the belts is hanging free of any further or additional support so that the leading edge of the book fans open freely for entry onto the fixed splitter blade.

The invention is illustrated in a preferred embodiment in the accompanying drawings, in which:

Fig. 1 is a side elevational view of a machine embodying the invention;

Fig. 2 is a section taken as indicated along the line 2—2 of Fig. 1;

Fig. 3 is a fragmentary section on an enlarged scale taken as indicated along the line 3—3 of Fig. 1;

Fig. 4 is a fragmentary section on an enlarged scale taken along the line 4—4 of Fig. 1;

Fig. 5 is a fragmentary section on an enlarged scale taken as indicated along the line 5—5 of Fig. 1;

Fig. 6 is a fragmentary section taken as indicated along the line 6—6 of Fig. 4;

Fig. 7 is a fragmentary section taken as indicated along the line 7—7 of Fig. 6;

Fig. 8 is a fragmentary section taken as indicated along the line 8—8 of Fig. 6;

Fig. 9 is a fragmentary section on an enlarged scale taken as indicated along the line 9—9 of Fig. 1;

Fig. 10 is a fragmentary section on an enlarged scale taken as indicated along the line 10—10 of Fig. 3;

Fig. 11 is a fragmentary section on an enlarged scale taken as indicated along the line 11—11 of Fig. 3;

Fig. 12 is a fragmentary section on an enlarged scale taken as indicated along the line 12—12 of Fig. 2;

Fig. 13 is a generally diagrammatic view of the device, taken substantially as a section along the line 13—13 of Fig. 2;

Fig. 14 is an enlarged fragmentary section taken substantially as indicated along the line 14—14 of Fig. 2;

Fig. 15 is a perspective view of a book as it appears when it is delivered from the book forwarding mechanism onto the delivery rail for the casing-in machine; and Fig. 16 is a diagram of the electromechanical controls for the device.

Referring to the drawings in greater detail, and referring first to Figs. 1 and 13, the machine consists generally of a base indicated at A which has at one end an infeed extension portion A1 on which is mounted an infeed B and is adapted to carry books b in abutting end to end relationship with their spines up as the books come from a backing or lining operation where they are given proper backbone configuration and provided with a backing or lining strip s (see Fig. 15). The line of books on the infeed B is stopped by an escapement mechanism indicated generally at C which operates to pass books one at a time in spaced relationship to a book forwarding mechanism D. The book forwarding mechanism D operates 25% faster than the infeed mechanism B so that it pulls a gap between the book last passed by the escapement C and the next succeeding book. At the end of the base A opposite the infeed mechanism B is a book splitting unit indicated generally at E which acts upon the books as they are carried by the forwarding mechanism D. The entire unit is driven and operated by power distributing and timing mechanism indicated generally at F.

Referring to the drawings in greater detail and referring first to Figs. 1 to 5, the base A includes a carriage 20 provided with casters 20a and jack screws 20b so that the machine may be readily moved into proper position between a backing and lining machine and a casing-in machine and then fixed in place by elevating the jack screws. Extending upwardly from the carriage 20 is a frame 21 which includes longitudinally extending side plates 23 and 24 connected by cross members 22a and 22b (Fig. 13) and surmounted by a table top 25 which overhangs the side plates on both sides (Fig. 5). The infeed extension portion A1 of the base A is formed by the forwardly extending integral support arm portions 23a and 24a of the side plates 23 and 24.

The book carrier bar of a casing-in machine must be adjustable vertically to accommodate books of different widths (the distance from the spine or backbone to the open front edge of the book). Thus, the present book feed unit must be vertically adjustable to align the book support of this unit with that of the casing-in book carrier. This is accomplished by mounting the frame 21 so that it is vertically adjustable. As seen in Fig. 13 the frame cross members 27a and 27b are secured to center tubes 17 and 18 which are mounted for vertical movement on jack screws 17a and 18a. An upright hand crank member 19 (Fig. 1) mounted on brackets 19a on side plate 23 is connected by a chain and sprocket mechanism, indicated generally at 19b, to the jack screws 17a and 18a for elevating the frame 21.

Referring now particularly to Figs. 1, 2 and 13, the infeed support arms 23a and 24a are provided with a plurality of spaced coplanar laterally aligned bearing bosses 26 and 27, respectively, in which are mounted roller shafts 28 carrying book feed rollers 29. Each roller shaft 28 alongside the bearing 27 is provided with a pinion 30, and engaging the pairs of adjacent pinions 30 are drive gears 31 which are journalled on suitable inwardly extending stub shafts on the infeed support arm 24a. As seen in Fig. 13 there are eight roller shafts 28 with seven intermeshing gears 31, and the center gear of the seven is carried on an elongated rotatable shaft 32a which carries a drive sprocket 33 by means of which all the infeed rollers are driven from the drive and timing mechanism F as will be described.

As seen in Figs. 1 and 2, there are spaced parallel infeed guide plates 34 and 35 which are secured, respectively, to the infeed arms 23a and 24a by brackets such as the bracket 36 shown in Fig. 1. The guide plates 34 and 35 have arcuate clearance surfaces 37 along their lower margins to provide clearance above the rollers 29 and to prevent the entanglement of the end sheets of the book between the roller and guide plates. The guide plates terminate adjacent the last infeed roller 29 as shown at 37a in Fig. 1.

As best seen in Figs. 1, 2, 9 and 13, a longitudinal book support guide 38 is mounted on the table top 25 in line with the center line of the infeed conveyor B and has an arcuate top surface 38a. The support guide 38 has its book receiving end between the inner ends of the guides 34 and 35 which flank the infeed rollers 29. Flanking the support guide 38 is a pair of longitudinal, laterally adjustable book side guides 39 and 40 which are generally aligned, respectively, with the infeed side guides 34 and 35. As seen in Fig. 2, the side guides 39 and 40 have flared book receiving end portions 39a and 40a just beyond the most inward roller 29 of the infeed B. As best seen in Figs. 2 and 9, the two ends of the book side guides 39 and 40 are mounted on parallel arm mechanisms 41—41a and 42—42a, respectively, which, in turn, are pivoted on upright lugs 43—43a and 44—44a on rack members 45—45a and 46—46a, respectively. Thus, the side guides 39 and 40 may rest on the support guide 38, and forcibly follow contour 38a when adjusted in or out by the diagonally disposed tension springs 41c—41d and 42c—42d, respectively. Lateral adjustment of the side guides 39 and 40 is obtained by mounting the rack members 45 and 46 slidably in brackets 47 and 48, so that they may be adjusted by a mechanism which is best seen in Figs. 2 and 12.

Mounted under the table top 25 in a suitable bracket and with its inner end journalled in a bearing in the side plate 23 is a transverse shaft 49 having a hand wheel 50 accessible from outside the edge of the table top. A worm 51 on the shaft 49 engages a complementary gear 52 on a longitudinal shaft 53 which is journalled under the table top immediately outside the side plate 23. At one end of shaft 53 is a pinion 54 which engages rack 45. At the opposite end of shaft 53 is a pinion 54a which engages rack 45a. Thus, movement of the hand wheel 50 acts to move racks 45 and 45a in coordination, thus moving the book supporting side rail 39 in or out parallel to the longitudinal center line of the support guide 38. A similar shaft 55 is mounted coaxially with the shaft 49 on the opposite side of the table 25, and has its inner end journalled in the side plate 24. Shaft 55 has a hand wheel 56, and a worm 57 engages a suitable gear 58 on a longitudinal shaft 59 which in turn has spur gears 60 and 60a meshing with the racks 46 and 46a for the side guide 40 so that said side guide may be adjusted independently of the side guide 39.

As best seen in Figs. 1 and 9, the escapement mechanism C is mounted on a pair of upright supports 61 and 62 which flank the table top 25 at its extreme infeed end. The plates 61 and 62 have aligned clamps 63 and 64, respectively, to receive a crossbar 65, and at the front of the side plates 61 and 62 are clamps such as the clamp 66 seen in Fig. 1 for a crossbar 67 which is coplanar with the crossbar 65. The crossbars 65 and 67 serve as supports for clamp brackets 68 and 69, respectively, which in turn provide supports for parallel longitudinal shafts 70 and 71 on which are journalled "ice tongs-type" escapement gates 72 and 73. The two escapement gates are alike, so only gate 73, seen in Fig. 9, will be described in detail. Gate 73 includes a pair of collars 74 and 75 which are provided with intermeshing gear segments 74a and 75a so that the two collars rotate in opposite directions when either one is actuated. On the collar 74 is a bell crank 76 which has an actuating arm 77 and a stop arm 78, while on the collar 75 is a stop arm 79. The stop arms 78 and 79 have opposed facing stop fingers 78a and 79a which may close adjacent the upper end of a book b so as to stop further forward movement of the book on the infeed B. Actuation of the escapement gate 73 is by means of a solenoid 80 which is mounted on the escapement side plate 61 and has a link 81 secured to its plunger 80a and pinned at 82 to the outer end of the bell crank actuating arm 77. Thus, when solenoid 80 is actuated the plunger moves upwardly, rocking the bell crank 76 so as to swing the ice tongs stop arms 78 and 79 apart.

Similarly, as seen in the diagrammatic electro-mechanical view, Fig. 16, the ice tongs element 72 has a bell crank 83 with an actuating arm 84 from which a link 85 extends to a plunger 86a of a solenoid 86.

As will be explained in more detail in connection with the electromechanical controls, the escapement C is so arranged that the ice tongs gates 72 and 73 open alternately. As previously pointed out, the book forwarding means D is driven 25% faster than the book infeed means B. Thus, initially a line of books b on the infeed means B is stopped by the first gate 72 of the escapement C, and when the gate 72 opens the line moves along until the first book is stopped by the closed gate 73. As this book is engaged by the forwarding means D the gate 73 opens and the higher speed of the forwarding means D pulls the first book away from the second book leaving a gap between the books into which the first gate 72 may close so as to hold back the remaining books. As soon as the book just fed is free of gate 73 the machine is timed to close gate 73 and again open gate 72 to let the line of books move along until the first book in the line is again stopped by gate 73. Thus, the escapement mechanism C in combination with the difference in speed between the book infeed B and the book forwarding means D acts to feed the books seriatim in spaced relationship through the machine.

As seen in Figs. 1 and 2, on the side plate 34 of the infeed is a Microswitch 87 which has a switch arm 88 in position to be contacted by each book b as the book approaches the location of gate 72. The Microswitch 87 acts as a safety device to prevent the gate 72 from opening unless there is a book in position to move through to gate 73. The mechanism by which this is accomplished will be described in more detail in connection with the drive and electromechanical controls.

The book forwarding mechanism D is best seen in Figs. 1, 3, 5, 10 and 11. The book forwarding mechanism includes complementary book forwarding belt units 89 and 90 which extend along the two sides of the table top 25. Referring particularly to Figs. 3, 5, and 10, at the two ends of the table top outside the side frame member 23 are bridge-like brackets 91 and 92 which are apertured to receive a rotatable shaft 93 which has a pinion 94 situated under the bracket 91 and a pinion 95 situated under the bracket 92 (see Fig. 5), and as seen in Figs. 3 and 10 there is a center guide block 96 positioned intermediate the two ends of the table 25. A carriage, indicated generally at 97, of the belt unit 89 has a top plate 97a, spacers such as spacer 97c in Fig. 5, and a bottom plate 97b which is provided with racks 98 and 99 meshing, respectively, with the pinions 94 and 95 and guided for sliding movement under the bridge-like brackets 91 and 92. The center guide 96 for the carriage 97 has an opening to slidably receive a guide arm 100 which extends outwardly from a bracket 102 which is secured to carriage 97 by bolts 101. As best seen in Fig. 3, the carriage 97 has a fixed sheave 103 on an upright shaft 103a between the top and bottom plates 97a and b at its book receiving end adjacent the book infeed B, and a sheave 104 at the opposite end which is mounted on a longitudinally adjustable spindle 104a between said plates. As best seen in Figs. 10 and 11 each of the sheaves 103 and 104 has two parallel grooves in its circumference to accommodate upper and lower V-belts 105 and 106, respectively. The belts 105 and 106 are also guided on a fixed idler guide sheave 107, a belt tensioning sheave 108 and a drive sheave 109. As best seen in Fig. 10, the mounting for the fixed idler sheave 107 consists of a post 110 with an overhanging bracket 111 beneath which the sheave 107 is supported on an upright spindle 112. As best seen in Fig. 11, the tensioning sheave 108 is mounted on an upright spindle 113 hung beneath an inwardly extending lever arm 114 which is pivotally supported on an upright rod 115 on a bracket 116 which is mounted on the outside of the escapement frame member 61. The lever arm 114 extends outwardly from the pivot 115 so as to accommodate a coil tension spring 117 by means of which the tensioning sheave 108 bears inwardly against the V-belts 105 and 106 to keep them in tension. As best seen in Fig. 1, the drive sheave 109 is mounted on a long, upright shaft 118 which is journalled in suitable bearings 119 and 120 which are positioned, respectively, in the table top 25 and on a bracket 121 mounted on the side plate 23 of the frame. As best seen in Fig. 4, the bearing 120 is laterally adjustable with respect to the frame side plate 23 to obtain proper alignment of the shaft 118. The driving connections for the drive sheave 109 will be explained in more detail later.

As best seen in Fig. 3, the book forwarding belts 105 and 106 have a long book gripping run which extends parallel to the support guide 48 between the sheaves 103 and 104. In order that the book forwarding belts 105 and 106 may have appropriate gripping action with one side of a book b, the belts 105 and 106 are supported and resiliently guided between the sheaves 103 and 104 by means of a series of resiliently supported guide pulleys. As best seen in Fig. 3, the guide pulleys, all of which are identified by the reference numeral 122, are mounted in groups of two or three between the top plate 97a and the bottom plate 97b of the carriage. The carriage plates 97a and 97b are provided with a series of aligned laterally extending slots 123 through which extend upright spindles 122a for the guide pulleys 122. As seen in Figs. 3 and 10, between a pair of adjacent slots 123 the top and bottom plates 97 and 97a of the carriage are provided, respectively, with spring brackets 124 and 124a by means of which longitudinal pulley supporting spring arms 125 and 125a are mounted so that they may extend through registering holes in the upper and lower ends of the pulley shafts 122a. Thus, each pulley is resiliently held in place with respect to the belts 105 and 106 so that as the belts engage a side of a book the guide pulleys 122 may move resiliently and laterally.

The book forwarding belt unit 90 is exactly like the book forwarding belt unit 89. As best seen in Fig. 3, bridge-like brackets 126 and 127 at the two ends of the table top 25 are positioned directly opposite the bridge-like brackets 91 and 92 previously described, and support a longitudinal shaft 128 which has pinions 129 and 130 mounted under the brackets 126 and 127, respectively. Rack members 131 and 132 are engaged, respectively, with the pinions 129 and 130 and are slidably mounted under the bridge-like brackets 126 and 127 so that a carriage 133 having a top plate 133a, a bottom plate 133b and spacers 133c (see Fig. 5) is laterally reciprocable with respect to the table top 25. A center guide block 134 has an opening to receive a plunger 135 mounted in a depending bracket 137 which is secured to the lower carriage plate 133b by bolts 136. A fixed sheave 138 is supported on an upright shaft 138a at the infeed end of the carriage 133 while a longitudinally adjustable sheave 139 is mounted on a slidable shaft 139a at the opposite end of the carriage 133. V-belts 140 and 141 are trained around the sheaves 138 and 139 and also engage a fixed idler sheave 142, a belt tensioning sheave 143 which is mounted on a swinging lever arm 144 and spring urged by a tension spring 145, and a drive sheave 146 mounted on an upright shaft 147 which is journalled in a fixed bearing 148 in the table top 25 and in an adjustable bearing 149 on a bracket 150 on the side plate 24 of the frame (see Figs. 4 and 5).

Guide pulleys 151 for the belts 140 and 141 are the counterparts of the guide pulleys 122 for the belts 105 and 106, and have their upright shafts 151a extending through slots 152 in the top and bottom plates 133a and 133b of the carriage 133, and said shafts 151a are impaled by spring arms 153 and 153a mounted in suitable brackets 154 on the top plate 133a and in corresponding brackets (not shown) on the bottom plate 133b of the carriage 133.

From the foregoing description of the book forwarding belt units 89 and 90 it is apparent that the carriages 97 and 133 may be moved inwardly simultaneously on their racks by suitable reciprocating mechanism, so that as a book b is released by the second set of arms 73 of the escapement C it may be firmly gripped between the book forwarding belts 105 and 106 on one side and the book forwarding belts 140 and 141 on the other side for movement along the guide rail 38. The resilient mounting of the guide pulleys 122 and 151 is very important in order that the book forwarding mechanism D may accommodate itself to minor variations in the thickness of succeeding books in a single run. As previously pointed out, books in one run may vary in thickness by an amount of the order of $\frac{1}{16}$ inch due to variations in thickness of the paper in a single paper run.

As best seen in Figs. 2, 13 and 14, the machine of the present invention is provided with the book splitting mechanism E which includes the innermost end portion of the book support guide 38. As seen in Fig. 2, mounted respectively upon the book side guides 39 and 40 above the support guide 38 and below the plane of the belts 106 and 141 is a pair of book fanning fingers 155 and 156. As Fig. 13 clearly shows, the forwarding belts are about halfway between the spine and the lower margin of a book so that the open lower edge portion of the book is hanging pendant below the lower belts 106 and 141. As the book is moved by the forwarding belts its forward portion is compressed by the fanning fingers 155 and 156 and then, as the forward portion moves free of the fanning fingers the pages fan out so that the book may ride over a splitter blade 157 which has an inclined forward end 158. The top surface 38a of the book support guide 38 has a recess 159 at the base of the inclined forward end 158 of the splitter blade 157 so that the front margins of the pages of a book b are completely free from any contact with the support guide 38 as they leave the fanning strips 155 and 156 and are about to meet the splitter blade 157. Thus, the pages are free to bend sideways so that the splitter blade may be flanked by two of the spread apart pages of the book. The outer end of the splitter blade 157 merges into an inclined leading edge 160 of the case in splitter blade 161 on which the books may be pushed along toward a casing-in machine with the books supported on the carrier bar 161a of the casing-in machine as seen in Figs. 13 and 15.

The driving and timing mechanism F for the unit is best seen in Figs. 1, 4 to 8 and 13. This mechanism must be so constructed as to drive the infeed B at a predetermined speed, drive the book forwarding mechanism D at 25% faster speed than the infeed, and coordinate the operation of the escapement gates 72 and 73 with the converging and diverging of the forwarding belt units 89 and 90 of the forwarding mechanism and also with the starting and stopping of the drive for the belt units. In order to avoid damage to the outside pages of the book it is necessary that the belts be in contact with the faces of the book before the belts are moving.

Referring first to Figs. 1 and 4, the drive for the entire mechanism is through a main drive shaft 162 which is journalled in bearing blocks 163 and 164 on the outside of the frame side plate 23. The shaft 162 at its outer end has a yoke 165 with a pin 166 affording a universal mounting for a drive shaft 167 which is connected to the case-in machine for source of power in order to maintain a timed relationship between the two machines. At the inner end of the main shaft 162 is a bevel gear 168 which meshes with a bevel gear 169 on a transverse shaft 170 which is mounted in bearing members 171 and 172 on the side plates 23 and 24, respectively. Just inside the side plate 24 on the shaft 170 is keyed a sprocket 173 for a roller chain 174 (see Fig. 13) which meshes with the infeed drive sprocket 33. Outside the bearing 172 on the side plate 24 the transverse shaft 170 is provided with a bevel ring gear 175 which meshes with a bevel pinion 176 which provides the input for a standard commercially available single revolution clutch 177 such, for example, as a Hilliard type 6 clutch. The single revolution clutch is of an overrunning type in which the input side 178 runs constantly, while movement of the output side 179 may be prevented by any suitable latch or brake member. When the latch or brake member is released the output side 179 is free to travel with the input side 178 until the latch or brake is again engaged. In the present structure, the output side 179 of the single revolution clutch 177 is keyed to the drive shaft 147 for the drive sheave 146 of the book forwarding belt mechanism 90. Thus, the book forwarding belt mechanism may operate for a single revolution of clutch 177 under the control of a mechanical latch mechanism which will be described. The book forwarding belt unit 89 is driven simultaneously with the unit 90 by reason of the fact that the shaft 147 has a bevel gear 180 at its lower end, below the single revolution clutch 177, and this in turn meshes with a bevel gear 181 on a bottom cross shaft 182 which is journalled in bearings 183 and 184 in the side plates 23 and 24 respectively, and has a bevel gear 185 at its opposite end outside the side plate 23. The bevel gear 185 in turn meshes with a bevel gear 186 on the lower end of drive shaft 118 for the drive pulley 109 of the belt unit 89.

The control for the single revolution clutch is best shown in Figs. 6 to 8, and consists of a bell crank indicated generally at 187 which has an upright pivot 188 rotatably mounted in the bearing bracket 150 and in an upper bracket 189 on the side plate 24. The bell crank has an upstanding control arm 190 which is on a laterally extending bracket 191 on the pivot 188, and a rearwardly projecting spring arm 192 which is provided with a stud 193 to act as a guide for a compression spring 194. Extending laterally from the bracket member 191 is a threaded rod 195 on which a sleeve 196 for a latch dog 197 is mounted, and the dog sleeve 196 is resiliently supported on the rod 195 by means of a compression spring 198 which may be adjusted by means of the threaded nut 199. On every revolution of shaft 170 bell crank 187 may be rocked on its pivot 188 by means of an actuator finger 200 which is integrally formed with a clamping collar 201 which is clamped onto the collar 175a at the base of the bevel gear 175 on shaft 170.

The latch dog 197 on sleeve 196 is normally urged into engagement with a latch shoulder 179a on the power take-off side 179 of the single revolution clutch 177. This engagement is maintained by the thrust of the compression spring 194 on the bell crank arm 192. The shaft 170 and bevel gear 175 rotate in the direction indicated by the arrow in Fig. 6, and on each rotation the control finger 200 contacts the upstanding actuating arm 187 so as to rock the bell crank about the pivot 188 in the direction shown by the arrow in Fig. 7 adjacent the spring 198. This swings the latch dog 197 out from in front of the latch shoulder 179a on the single revolution clutch and permits the clutch to make one revolution which is stopped when the shoulder 179a again abuts against the finger 197. The resilient mounting of the latch dog sleeve 196 on the compression spring 198 acts as a cushion to ease the shock of stopping the clutch takeoff sleeve 179 at the end of the single revolution. The spring adjuster screw 199 permits adjustment of this shock absorbing effect of the sleeve 196.

Referring now to Figs. 4, 5 and 13, the shaft 170 also carries a control cam 202 for the reciprocation of the forwarding belt unit carriages 97 and 133. As seen in Fig. 13, a sleeve 203 on book side plate adjusting shaft 49 (see Fig. 12) provides a rocking support for a cam follower arm 204 which has a cam follower roller 205 riding on cam 202. Pivoted to the lower end of cam follower arm 204 is a link 206 which is pivoted to one arm of a bell crank 207 on a shaft 208 which operates an air valve. The opposite arm 209 of the bell crank receives an upwardly extending tension spring 210 secured to a stud 210a on the underside of the table top 25 which acts as a cam follower spring holding the cam follower arm 204 and roller 205 in contact with cam 202.

On the center tube 18 for frame 21 is a clamp block bracket assembly 211 which carries a pinion 212 by means of which it may be vertically adjusted on a rack 213 on tube 18. When adjusted the clamp block may be tightened on the tube 18 to hold it in place. The bracket assembly 211 furnishes a vertically adjustable support for a double action air cylinder 214 which has an upwardly extending piston rod 215. As best seen in Fig. 5, a plate 216 is secured to the upper end of the piston rod 215 and is provided with opposed racks 217 and 218 which mesh, respectively, with gear segments 219 and 220 which are mounted on longitudinal shafts 221 and 222 on side plates 23 and 24. The gear segments 219 and 220 in turn mesh, respectively, with pinions 223 and 224 on the longitudinal shafts 93 and 128, respectively, by means of which the racks 98 and 132, respectively, for the carriages 97 and 133 are reciprocated. The rack and pinion mounting for the clamp bracket 211 upon which the air cylinder 214 is mounted permits the cylinder to be vertically adjusted so as to adjust the space between the belt carriages 97 and 133 to accommodate books of different thicknesses. Thus, a very short throw air cylinder may be used, and in a commercial embodiment of the device it has been found that a ½ inch throw is adequate for proper reciprocation of the belt carriages 97 and 133. The air valve and the air cylinder 214 are constructed for two-way action so that the cylinder operates under pressure in both directions of movement of the piston for the piston rod 215 in a way that is well known.

It has been previously mentioned in connection with the escapements C that each of the escapement members 72 and 73 is operated by a solenoid. Actuation of the solenoid is controlled by a pair of Microswitches 225 and 226 (Figs. 1 and 16) which are mounted on the side plate 23 adjacent the power input shaft 62, and between the bearings 163 and 164 for said shaft. The Microswitches 225 and 226 have their respective arms 225a and 226a adjacent the shaft 162 on which is mounted a double cam member 227 which has a recess 228 in one margin to actuate the Microswitch arm 225a and a recess 229 in the opposite margin to actuate the Microswitch arm 226a. Thus, the opening and closing of the escapement gates 72 and 73 is controlled directly off the main drive shaft 162, while reciprocation of the belt carriages 97 and 133 is controlled off the transverse shaft 170 which is driven at a 1:1 ratio with the main power shaft 162. Consequently the timing and control of the machine is very simple and practically can not get out of phase.

The wiring diagram, Fig. 16, shows the control arrangement for the escapement gates 72 and 73, through the Microswitches 225 and 226 and the cam 227. Electric circuits for the controls pass through a terminal strip 230 which is provided with terminals 231a, 232a, 233a, 234a, 235a and 236a for correspondingly numbered circuits. The circuits 231 and 232 are the main electric leads, and are connected to a suitable source of electrical power. The side of the circuit which passes through the terminal 231a is also connected with a terminal 231b of a switch 237b in a power relay 237, and to one side of 231c of a coil 237a of relay 237. It is also connected to one side 231d of a latching coil 238a for a latching relay 238. The circuit through the terminal 232a has a lead which goes through terminals 232b and 232c for switch 238a of latching relay 238, and from the terminal 232c a line goes to one side 232d of power relay coil 237a. Also from terminal 232a lines go, respectively, to terminals 232e and 232f for the switch arms 225a and 226a of the Microswitches 225 and 226. There is also a line from terminal 232a to one side 232g of solenoid 86 and a line from 232a to one side 232h of solenoid 80.

The circuit which includes terminal 233a connects a terminal 233b for the switch 237b of the power relay 237 to the opposite side 233c of solenoid 86 for the first gate 72; while the circuit which includes the terminal 234a connects a terminal 234b for the switch 237b of the power relay 237 to the opposite side 234c of the solenoid 80 for the second gate 73. The circuit which includes the terminal 235a connects the other end 235b of latching coil 238a in latching relay 238 with a switch terminal 235c of Microswitch 225, and this connection is made through the "no book" Microswitch 87 which is provided with terminals 235d and 235e for the switch arm 88. Finally, the circuit which includes the terminal 236a connects the other end 236b of the unlatching coil 238b of the latching relay 238 with a switch contact 236c for the switch arm 225a of Microswitch 225.

The operation of the escapement control is as follows: The "no book" Microswitch arm 88 is spring urged to open position, but is normally kept closed by the switch arm bearing against the continuous line of books coming off the infeed conveyor. If there is a gap in the books the switch arm 88 automatically moves to open position breaking the circuit through the contact 235d. The Microswitches 225 and 226 which control operation of the escapement gates 72 and 73 have their respective switch arms 225a and 226a spring urged to closed position against the contacts 235c and 236c respectively, and the switches are normally held open by contact of their switch arms with the cam 227. The switch arm 237b of relay 237 is spring urged against contact 234b so that there is ordinarily a closed circuit to solenoid 80 of the second escapement gate 73, so that gate is open.

When Microswitch arm 225a drops into cam recess 228 on the cam 227 the switch arm 225a moves against contact 235c which closes the circuit 235 provided there is a book in position to keep the "no book" Microswitch 87 closed against contact 235d. This energizes latching coil 238a of latching relay 238 and closes relay switch 238c against contacts 232b and 232c, thus closing circuit 232 to the relay coil 237a of relay 237. This, in turn, swings the relay switch arm 237b from contact 234b to contact 233b thus breaking circuit through contact 234 to close gate 73 and making the circuit through the contact 233b so as to energize solenoid 86 and open the first escapement gate 72. If there is no book in position to pass gate 72 in proper time the "no book" Microswitch is open at contact 235d to prevent this operation. The first book b on the infeed B passes gate 72 and is stopped by gate 73; but the gates are so close together that the next book, which is normally butted against the first book, has not reached gate 72.

Almost immediately, Microswitch arm 226a drops into cam recess 229 and closes circuit 236 at contact 236c. This energizes the unlatching relay 238b of latching relay 238 and breaks circuit 235 at the contacts 232b and c of latching relay 238. This deenergizes coil 237a of relay 237 and permits switch arm 237b to return to its normal position against contact 234b, thus opening gate 73 and releasing gate 72 which drops against the sides of the first book. This action is timed to take place in coordination with the convergence of the book forwarding belt units 89 and 90 upon a book held by the escapement gate 73 so that this book may be moved rapidly away from the next book which has not yet reached the jaws of escapement gate 72. The jaws of gate 72 merely rest lightly upon the front and back pages of a book, and are preferably faced with "Teflon" or some other very smooth plastic so as to interfere as little as possible with free pulling of a book from between the jaws. Thus, when the book is pulled out from between the jaws of gate 72 by the book forwarding mechanism D the gate closes by gravity behind that book and in front of the next book.

The timing of the machine is such that the actuation of the air cylinder 214 to close the book forwarding belt units 89 and 90 is immediately followed by the release of the single revolution clutch to permit the belt units to drive at the instant they contact the book released by the gate 73. As the belt drive again stops the belts move apart by reversal of the valve for air cylinder 214, and as this occurs the escapement gate cycle starts to repeat by the closing of gate 73 and the opening of gate 72 to place another book in position for handling by the book forwarding belt units when they are next moved together by operation of the air cylinder.

The foregoing detailed description is given for clearness of understanding only and no unnecessary limitations are to be understood therefrom, as some modifications will be obvious to those skilled in the art.

We claim:

1. A book feed device for a casing-in machine comprising: a base; a driven book infeed at one end of said base to support and feed books seriatim with their spines uppermost; a book support guide on the base which has a receiving end adjacent and substantially coplanar with the inner end of the infeed and a discharge end portion below its receiving end; a pair of transversely spaced, laterally movable carriages flanking the support guide; book forwarding means comprising a belt unit on each carriage, said belt units including vertically spindled grooved sheaves and V-belts on said sheaves with facing, parallel, book-gripping runs spaced above the support guide so that said belts may carry books horizontally with their lower portions free; escapement means between said infeed and said forwarding means adapted to release books seriatim to the forwarding means in spaced relationship to one another; reciprocating means for moving said carriages inwardly to engage the V-belts with a book as it is released by said escapement; intermittent drive means adapted to drive said belt units only while they are engaged with a book; means for fanning the lower portions of the pages of a book in the forwarding means while the forward ends of the pages are spaced above the discharge end portion of the support guide; and a longitudinal knife edge on the base midway between the belt units onto which a book with its pages fanned is carried by the forwarding means.

2. In a book feed device which is adapted to deliver books to a casing-in machine seriatim in spaced relationship with their spines uppermost, book forwarding means comprising: a base; a pair of transversely spaced, laterally reciprocable carriages on said base; a belt unit on each carriage, each belt unit including a pair of longitudinally spaced vertically spindled sheaves, a belt trained over each of said pairs of sheaves, said belts having parallel, book-gripping runs between said sheaves so that they may grip books which have their spines uppermost and carry them horizontally, and a plurality of closely spaced belt carrier pulleys mounted between said sheaves on laterally resilient mountings; reciprocating means for moving said carriages inwardly to engage the belts with a book; and intermittent drive means adapted to drive said belt units only while they are engaged with a book.

3. In a book feed device which is adapted to deliver books to a casing-in machine seriatim in spaced relationship with their spines uppermost, book forwarding means comprising: a base; a book support guide on said base which has a receiving end and a discharge end portion below its receiving end; a pair of transversely spaced, laterally reciprocable carriages flanking said support guide; a belt unit on each carriage, each belt unit including vertically spindled grooved sheaves and a V-belt, said V-belts having facing, parallel book-gripping runs spaced above the support guide so that they may grip books which have their spines uppermost and carry them horizontally; reciprocating means for moving said carriages inwardly to engage the V-belts with a book; intermittent drive means adapted to drive said belt units only while they are engaged with a book; means for fanning the lower portions of the pages of a book in the forwarding means while the forward end portions of the pages are spaced above the discharge end portion of the support guide; and a longitudinal knife edge midway between the belt units onto which a book with its pages fanned is carried by the forwarding means.

4. In a book feed device which is adapted to deliver books to a casing-in machine seriatim in spaced relationship with their spines uppermost, book forwarding means comprising: a base; a pair of transversely spaced, laterally reciprocable carriages on said base; a belt unit on each carriage, each belt unit including a pair of longitudinally spaced vertically spindled sheaves, a belt trained over each of said pairs of sheaves, said belts having parallel book-gripping runs between said sheaves so that they may grip books which have their spines uppermost and carry them horizontally, and a plurality of closely spaced belt carrier pulleys mounted between said sheaves on laterally resilient mountings; reciprocating means including a cylinder and fluid actuated piston for moving said carriages inwardly to engage the belts with a book, said reciprocating means being adapted to produce equal gripping pressures on books in the forwarding means through a substantial range of different book thicknesses; and intermittent drive means adapted to drive said belt units only while they are engaged with a book.

5. In a book feed device which is adapted to deliver books to a casing-in machine seriatim in spaced relationship with their spines uppermost, book forwarding means comprising: a base; a book support guide on said base which has a receiving end and a discharge end portion below its receiving end; a pair of transversely spaced, laterally reciprocable carriages flanking said support guide; a belt unit on each carriage, each belt unit including vertically spindled grooved sheaves and a V-belt, said V-belts having facing, parallel, book-gripping runs spaced above the support guide so that they may grip books which have their spines uppermost and carry them horizontally, and a plurality of closely spaced belt carrier pulleys mounted between said sheaves on laterally resilient mountings; reciprocating means for moving said carriages inwardly to engage the V-belts with a book; intermittent drive means adapted to drive said belt units only while they are engaged with a book; means for fanning the lower portions of the pages of a book in the forwarding means while the forward end portions of the pages are spaced above the discharge end portion of the support guide; and a longitudinal knife edge midway between the belt units onto which a book with its pages fanned is carried by the forwarding means.

6. In a book feed device which is adapted to deliver books to a casing-in machine seriatim in spaced relationship with their spines uppermost, book forwarding means comprising: a base; a book support guide on said base which has a receiving end and a discharge end portion below its receiving end; a pair of transversely spaced, laterally reciprocable carriages flanking said support guide; a belt unit on each carriage, each belt unit including vertically spindled grooved sheaves and a V-belt, said V-belts having facing, parallel, book-gripping runs spaced above the support guide so that they may grip books which have their spines uppermost and carry them horizontally; reciprocating means including a cylinder and fluid actuated piston for moving said carriages inwardly to engage the belts with a book, said reciprocating means being adapted to produce equal gripping pressures on books in the forwarding means through a substantial range of different book thicknesses; intermittent drive means adapted to drive said belt units only while they are engaged with a book; means for fanning the lower portions of the pages of a book in the forwarding means while the forward end portions of the pages are spaced above the discharge end portion of the support guide; and a longitudinal knife edge midway between the belt units onto which a book with its pages fanned is carried by the forwarding means.

7. In a book feed device which is adapted to deliver books to a casing-in machine seriatim in spaced relationship with their spines uppermost, book forwarding means comprising: a base; a book support guide on said base which has a receiving end and a discharge end portion below its receiving end; a pair of transversely spaced laterally reciprocable carriages flanking said support guide; a belt unit on each carriage, each belt unit including vertically spindled grooved sheaves and a V-belt, said V-belts having facing, parallel, book-gripping runs spaced above the support guide so that they may grip books which have their spines uppermost and carry them horizontally, and a plurality of closely spaced belt carrier pulleys mounted between said sheaves on laterally resilient mountings; reciprocating means including a cylinder and fluid actuated piston for moving said carriages inwardly to engage the belt with the book, said cylinder being adjustably mounted on the base to adjust the belt unit carriages to accommodate books of different thicknesses; intermittent drive means adapted to drive said belt units only while they are engaged with a book; means for fanning the lower portions of the pages of a book in the forwarding means while the forward end portions of the pages are spaced above the discharge end portion of the support guide; and a longitudinal knife edge midway between the belt units onto which a book with its pages fanned is carried by the forwarding means.

8. In a book feed device which is adapted to deliver books to a casing-in machine seriatim in spaced relationship with their spines uppermost, book forwarding means comprising: a base; means for feeding a line of books toward the base in end to end relationhip with their spines uppermost; book forwarding means on said base including a pair of laterally reciprocable complementary belt units having parallel longitudinal belt portions which may grip books with their spines uppermost and carry them horizontally; escapement means between said infeed and said forwarding means adapted to release books seriatim to the forwarding means in spaced relationship to one another; means for driving said belt units only while they are engaged with a book; and control means associated with said drive means and operating off of mechanically interconnected elements of said drive means for reciprocating said carriages in timed relationship with the operation of said escapement means and with the operation of said drive means.

References Cited in the file of this patent

UNITED STATES PATENTS 2,738,051  Beyer _____ Mar. 13, 1956